United States Patent [19]

Galeone et al.

[11] 3,711,913
[45] Jan. 23, 1973

[54] METHOD OF MAKING A COMPOSITE ROLL

[76] Inventors: Vincent A. Galeone, 2368 Greensward South, Warrington, Pa. 18976; Charles H. Amidon, Jr., 645 Lexington Rd., Warminster, Pa. 18974

[22] Filed: March 24, 1971

[21] Appl. No.: 127,473

[52] U.S. Cl. ................................29/148.4 D, 29/125
[51] Int. Cl. ...........................B21h 1/14, B23p 11/00
[58] Field of Search....................29/148.4 D, 447, 29/148.4 R, 148.4 A, 125

[56] References Cited

UNITED STATES PATENTS

| 2,501,630 | 3/1950 | Goulding | 29/148.4 D |
| 2,801,461 | 8/1957 | Kusters | 29/125 X |

Primary Examiner—Thomas H. Eager
Attorney—Meyer, Tilberry & Body

[57] ABSTRACT

Method of making a composite roll including a central metal shaft having a plurality of porous discs assembled thereon and held in compression. A sleeve member of synthetic plastic material is received over the porous discs. The porous discs are machined to form a substantially smooth and undamaged cylindrical surface prior to application of the plastic sleeve thereover.

2 Claims, 2 Drawing Figures

PATENTED JAN 23 1973 3,711,913
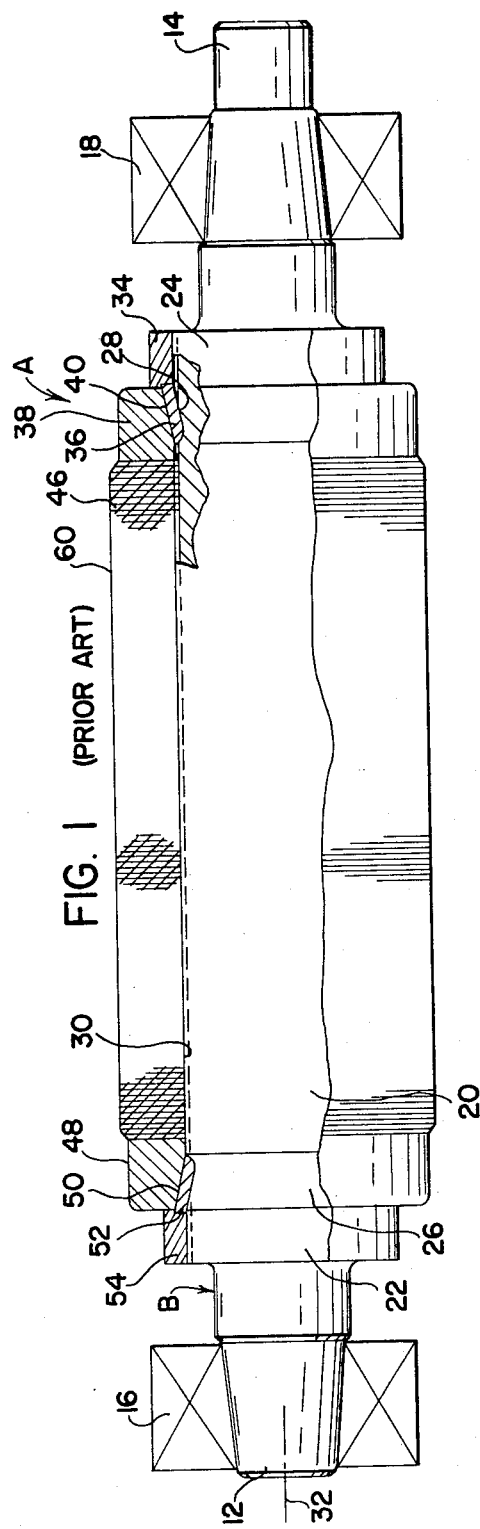
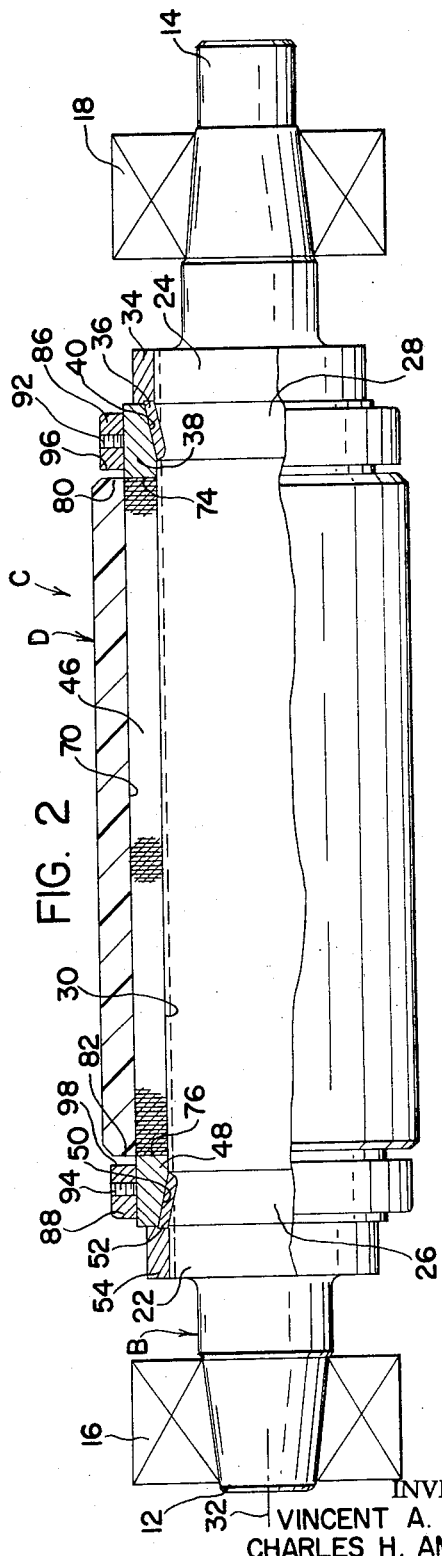
INVENTOR.
VINCENT A. GALEONE
CHARLES H. AMIDON, JR.
BY
Meyer, Tilberry & Body
ATTORNEYS

METHOD OF MAKING A COMPOSITE ROLL

BACKGROUND OF THE INVENTION

This application pertains to the art of rolls and more particularly to filled rolls. The invention is particularly applicable to filled rolls for use in textile calendering operations although it will be appreciated that the invention has broader applications and may be used in paper making machinery or the like.

Conventional rolls of a known type for use in calendering textile and paper are known as filled rolls. Such rolls include a central metal cylindrical shaft having a plurality of relatively porous discs assembled thereon and held in compression. Such discs are usually formed of non-woven filling material such as cotton, wool, paper, corn husk or various blends of other material. Such disc material might be termed relatively porous and has substantially less hardness as compared with a substantially rigid synthetic plastic material such as nylon. The relatively porous discs are held in compression on the roll shaft under high pressure while retaining means are applied to the shaft ends for holding the discs in compression. The outer surface of the discs is then machined to a substantially true cylindrical shape.

When used for calendering textile or paper, filled rolls are sometimes permanently damaged by a seam or foreign object passing through the nip of the calendar rolls. The seam or foreign object may cause a permanent indentation in the surface of the relatively porous discs. Such damage requires removal of the roll for repair. Very small permanent indentations may be removed by once again machining the entire surface of the roll. More extensive damage requires disassembly of the roll and placement of new discs thereon. The necessity of making such repairs is very expensive and results in lost time on the calendering machine.

Other calendering rolls of a known type include a sleeve of synthetic plastic material applied over a central metal shaft. One such roll is shown in U. S. Pat No. 3,365,774 to Kusters. In such rolls, the plastic material quickly recovers from a reasonable degree of surface indentation such as caused by a seam or foreign object. Such plastic sleeves also appear to produce more deformation at given temperatures and loadings, and usually produce a more desired luster for closing of the weave in a textile fabric at lower temperatures and loads than filled rolls.

Calender rolls are often used to emboss fabric to produce a three-dimensional effect. Such embossing may be accomplished by driving an engraved steel roll at the same surface speed as a mating filled roll of the same diameter. In such operations, the filled roll picks up and retains the impression of the engraved roll and operates as a second engraved roll. For this operation, retention of the impressed pattern is essential and a plastic sleeve type of roll could not be used. Even in these rolls, a seam or foreign object passing through the nip of the rolls may destroy the embossed pattern on the filled roll or produce a defect therein.

It would be desirable if a filled roll could be easily repaired for further use without requiring disassembly of the entire roll and placement of new discs thereon.

SUMMARY OF THE INVENTION

A damaged filled roll of the type described has its outer surface machined to provide a substantially smooth and undamaged cylindrical surface. A sleeve of relatively rigid synthetic plastic material is then shrunk fit onto the filled roll so as to be tight thereon. The filled roll is then ready for use once more without requiring disassembly of all of the discs and replacement thereof with new ones. The relatively porous discs beneath the plastic sleeve offer advantages not present in previous types of rolls. The relatively porous filling material retains lubricants and acts somewhat as a wick for such lubricant so that relative movement between the plastic sleeve and the filled roll is enhanced. The relatively porous discs offer a cushioning effect against mechanical shock to assist in preventing damage to the plastic sleeve. In a roll of the type including a plastic sleeve applied over a steel shaft, relative movement between the plastic sleeve and metal shaft may cause scoring. In the roll of the present invention, such relative movement will not produce scoring because of the softness of the relatively porous discs.

In rolls of the type including a plastic sleeve, it is desirable that the plastic sleeve operate at a uniform temperature to minimize build-up of internal stresses. In rolls of the type wherein the plastic sleeve is applied over a metal shaft, the metal shaft acts as a heat sink and creates a thermal gradient through the thickness of the plastic sleeve. In a roll constructed in accordance with the present invention, the filling material is a poor conductor of heat so the plastic sleeve will remain at a more uniform temperature.

In accordance with a preferred arrangement, the plastic sleeve is shrunk fit onto the filled roll so as to be tight thereon at normal room temperature and is free to move slightly at higher temperatures. Under operating conditions, it is desirable that the plastic sleeve be allowed to move slightly relative to the filled roll in order to dissipate any stresses occurring within the plastic sleeve. In one arrangement, the shrink fit of the plastic sleeve onto the filled roll is such that the plastic sleeve is tight at temperatures up to a predetermined maximum temperature and is free to move slightly relative to the filled roll at temperatures greater than the predetermined maximum temperature. In a preferred arrangement, the predetermined maximum temperature is not less than 90° F.

In accordance with a preferred arrangement, the filled roll includes retaining means for holding the relatively porous discs in compression on the metal shaft. The retaining means includes facing ends which face one another and are spaced-apart a predetermined distance. The sleeve member has an axial length not greater than the predetermined distance between the facing ends of the retaining means so that the plastic sleeve member has its inner surface in contact only with the relatively porous discs. In addition, collar means is preferably secured to the retaining means for holding the plastic sleeve member on the filled roll.

It is a principal object of the present invention to provide an improved calender roll.

It is also an object of the present invention to provide an improved method for renewing a filled role.

It is another object of the present invention to provide a composite roll having advantages not present in previous composite rolls.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 1 is a front elevational view of a prior art type of filled roll used to construct the improved composite roll of the present invention, and with portions cut away for clarity of illustration, and FIG. 2 is a front elevational view of an improved composite roll constructed in accordance with the present invention, and with portions cut away for clarity of illustration.

DESCRIPTION OF THE PREFERRED EMBODIMENT

Referring now to the drawings, wherein the showing are for purposes of illustrating a preferred embodiment of the invention only and not for purposes of limiting same, FIG. 1 shows a filled roll A having a central cylindrical metal shaft B. Metal shaft B includes opposite end portions 12 and 14 which are adapted to be mounted in bearings 16 and 18 when roll A is used in a calendering operation. Metal shaft B includes a substantially cylindrical central portion 20 having opposite end portions 22 and 24. Adjacent end portions 22 and 24, shaft B is formed with tapering surfaces 26 and 28. Tapering surfaces 26 and 28 lie substantially on the surfaces of a cone. For example, surface 26 lies on the surface of a cone having a larger diameter adjacent end portion 22 and a small diameter toward the center of roll B. Likewise, surface 28 lies on the surface of a cone having its larger diameter adjacent end portion 24 and its smaller diameter lying toward the center of shaft B. Shaft B includes a longitudinal keyway 30 extending the full length of cylindrical portion 20 parallel to longitudinal axis 32.

In assembling roll A, a metal shrink ring 34 may be heated and applied to end portion 24 of shaft B. A wedge means 36, in the form of two 180° arcuate segments, may then be placed on tapering surface 28. A cylindrical collar 38, having a cammed surface 40 for cooperation with the outer surface of wedge means 36, may then be slipped over end 22 of shaft B and moved longitudinally of shaft B into contact with wedge means 36 in the position shown. Shrink ring 34 may then be adjusted and allowed to cool. A plurality of discs 46, formed of non-woven filling material such as cotton, wool, paper, corn husk or various blends of material, are then placed over cylindrical portion 20 of shaft A. Discs 46 each include a key (not Shown) which is received in longitudinal keyway 30 of shaft B. When substantially the entire cylindrical portion 20 of shaft A is occupied by discs 46, a substantially cylindrical collar 48 is slipped over end portion 22 of shaft B into contact with the discs. Collar 48 has a cammed surface 50 for cooperating with wedge means 52. Wedge means 52 is preferably in the form of a plurality of arcuate segments each extending over only around 30° so they can be slipped between tapering surface 26 on shaft B and cammed surface 50 on collar 48. With wedge means 52 in position, roll A is placed in a press and a compressive force acting parallel to longitudinal axis 32 is applied to collars 38 and 48 to tightly compress discs 46. While the compressive force is still applied, heated shrink ring 54 is positioned over end portion 22 of shaft B and moved tightly against wedge means 52 and collar 48. While the compressive force on discs 46 is maintained, shrink ring 54 is pressed tightly against wedge means 52 and collar 48 until it cools and tightly grips end portion 22 of shaft B. It will be recognized that shrink ring 34 can also be applied at the same time as shrink ring 54 while compressive force is being applied parallel to longitudinal axis 32 against both collars 38 and 48 to tightly compress discs 46. Discs 46 are of a known type and are of relatively porous material which is also relatively soft. Roll A is then positioned in a lathe or the like so that outer peripheral surface 60 can be machined to a substantially smooth cylindrical surface. Outer cylindrical surface 60 of discs 46 extends outwardly further than the outer surface of collars 38 and 48 so that only discs 46 contact textile or paper material during a calendering operation.

As previously explained, the relatively soft and porous nature of discs 46 sometimes causes them to become damaged or to advantageous a permanent indentation formed therein when a seam or foreign object passes through the nip of the calendering rolls. Such damage requires removal of the rolls from the calendering machine for repair. Removal of the end retaining means, defined by shrink ring 34, wedge means 36 and collar 38 at end portion 24; and by shrink ring 54 wedge means 52 and collar 48 on end portion 22, is a very time consuming operation. Removal of such retaining means is necessary to remove discs 46 to place new discs on cylindrical portion 20 of shaft B for repairing roll A.

In accordance with the present invention, damage to cylindrical surface 60 of roll A is repaired in a novel and advantageous manner to provide an improved roll having certain advantages not previously found in the prior art. More specifically, a damaged roll A is removed from the calendering machine and the entire peripheral surface of discs 46, along with the outer peripheral surfaces of collars 38 and 48, are machined in a lathe or the like to provide a substantially smooth and undamaged cylindrical surface 70 for roll C shown in FIG. 2. Cylindrical surface 70 is continuous and extends along both discs 46, and collars 38 and 48.

A cylindrical nylon sleeve D, of substantially rigid synthetic plastic material, is then applied over cylindrical surface 70. Cylindrical sleeve member D may be formed of a polyamide such as nylon although it will be appreciated that other synthetic plastic materials having similar properties may also be used. Sleeve member D is of synthetic plastic material which is substantially harder than relatively porous discs 46. The outer diameter of surface 70 is related to the internal diameter of sleeve D in such a manner that sleeve D can be heated for placement over cylindrical surface 70 and then cooled so as to be a tight shrink fit on cylindrical surface 70. It will be recognized that after machining of roll A to the appearance shown in FIG. 2, shaft B, along with discs 46 and the retaining means defined by the shrink rings, wedges and collars, defines a core member on which cylindrical sleeve D is received.

In a preferred arrangement, collars 38 and 48 include facing surfaces 74 and 76 which face one another and are spaced-apart a predetermined distance along longitudinal axis 32. Sleeve D also includes end edges 80 and 82 which are spaced-apart a distance not greater than the predetermined spacing between facing surfaces 74 and 76. In a preferred arrangement, the distance between end edges 80 and 82 is slightly less than the distance between facing surfaces 74 and 76 so that sleeve D is received only over discs 46, and does not contact collars 38 and 48. This difference in length of sleeve D as compared to the spacing between facing surfaces 74 and 76 is preferably sufficient so that expansion of sleeve D during operation as a calendar role at higher temperatures will not cause sleeve D to expand longitudinally over collars 38 and 48.

In accordance with a preferred arrangement, subsequent to positioning of sleeve member D over cylindrical surface 70, a holding means in the form of cylindrical rings 86 and 88 are positioned over collars 38 48. Cylindrical rings 86 and 88 may have a plurality of circumferentially spaced threaded bores therein for receiving set-screws as at 92 and 94 which bear against the outer surfaces of collars 38 and 48 to hold rings 86 and 88 in position. Rings 86 and 88 will prevent movement of sleeve D longitudinally off of cylindrical surface 70. In the preferred arrange-ment, rings 86 and 88 have facing inner edges 96 and 98 which are positioned outwardly of outer edges 80 and 82 of sleeve D. Rings 86 and 88 may be positioned inwardly of the position shown in FIG. 2 so that edges 96 and 98 are spaced-apart a distance less than facing surfaces 74 and 76 of collars 38 and 48 in order to hold sleeve D against movement over the outer peripheral surfaces of collars 38 and 48 if longitudinal movement tends to occur.

Upon completion of the above described assembly operations, roll C is then ready for use in a calendering operation. It will be recognized that it is possible to saturate discs 46 with a lubricant prior to positioning of sleeve D thereover. The shrink fit between sleeve D and discs 46 is preferably such that it is tight at room temperature and just free to move at around 90°-110° F. Under operating conditions, sleeve D should be free to move slightly in order to dissipate any stresses occurring therein. Although plastic sleeves have previously been applied to a core member for use in calendering operations, the improved roll of the present invention provides relatively porous discs 46 which retain lubricant much better and allow some movement of sleeve D thereon during calendering operations. Discs 46 are also a poor conductor of heat so that sleeve D will operate at a more uniform temperature as compared to rolls in which the plastic sleeve is applied over a metal shaft which acts as a heat sink and creates a thermal gradient through the thickness of the plastic sleeve. Relatively porous and softer discs 46 also act somewhat as a mechanical shock absorber to prevent damage to plastic sleeve D when seams or foreign objects pass through the nip of the calender rolls. The improved method of renewing the filled roll also provides an improved and more efficient manner of making a damaged filled roll ready for use again without requiring removal of all the discs and replacement thereof. The improved roll constructed in accordance with the present invention has advantages not found in either filled rolls or previous plastic sleeve rolls.

While the invention has been described with reference to a preferred embodiment, it is obvious that alterations and modifications will occur to others skilled in the art upon the reading and understanding of this specification. The present invention includes all such equivalent alterations and modifications and is limited only by the scope of the claims.

Having thus described our invention, we claim:

1. A method of renewing a filled roll of the type including a plurality of substantially porous discs held in compression on a central shaft comprising the steps of machining the outer surface of said filled roll to reduce the diameter thereof and provide a substantially smooth and undamaged cylindrical surface, providing a cylindrical sleeve member of synthetic plastic material, heating said sleeve member to expand said sleeve member, placing said sleeve member over said filled roll, and cooling said sleeve member to shrink said sleeve member into a tight fit on said filled roll.

2. The method of claim 1 and further including the step of securing collars to the end portions of said filled roll outwardly of said sleeve member to retain said sleeve member on said filled roll.

* * * * *